(12) United States Patent
Kawanaka

(10) Patent No.: US 8,332,955 B2
(45) Date of Patent: Dec. 11, 2012

(54) TRANSACTION METHOD IN 3D VIRTUAL SPACE

(75) Inventor: Shinya Kawanaka, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 521 days.

(21) Appl. No.: 12/197,544

(22) Filed: Aug. 25, 2008

(65) Prior Publication Data

US 2009/0138943 A1    May 28, 2009

(30) Foreign Application Priority Data

Nov. 22, 2007    (JP) .................................. 2007-302801

(51) Int. Cl.
*H04L 29/06* (2006.01)
(52) U.S. Cl. ................... 726/27; 726/30; 715/757
(58) Field of Classification Search ............... 726/26–30; 715/706, 757
See application file for complete search history.

(56) References Cited

U.S. PATENT DOCUMENTS

| | | | | |
|---|---|---|---|---|
| 5,736,990 | A * | 4/1998 | Barrus et al. ................... | 345/630 |
| 6,421,047 | B1 * | 7/2002 | de Groot ........................ | 345/419 |
| 6,437,778 | B1 * | 8/2002 | Matsui et al. .................. | 345/419 |
| 6,741,241 | B1 * | 5/2004 | Jaubert et al. ................. | 345/419 |
| 6,772,195 | B1 * | 8/2004 | Hatlelid et al. ............... | 709/204 |
| 6,987,512 | B2 * | 1/2006 | Robertson et al. ............ | 345/427 |
| 7,148,892 | B2 * | 12/2006 | Robertson et al. ............ | 345/427 |
| 7,155,680 | B2 * | 12/2006 | Akazawa et al. .............. | 715/757 |
| 7,493,558 | B2 * | 2/2009 | Leahy et al. ................... | 715/704 |
| 7,685,017 | B2 * | 3/2010 | Matsui et al. ............... | 705/14.19 |
| 7,735,018 | B2 * | 6/2010 | Bakhash ........................ | 715/782 |
| 7,792,801 | B2 * | 9/2010 | Hamilton et al. ............. | 707/655 |
| 7,840,903 | B1 * | 11/2010 | Amidon et al. ................ | 715/757 |
| 7,865,545 | B1 * | 1/2011 | Estrada et al. ................ | 709/201 |
| 7,908,554 | B1 * | 3/2011 | Blattner ........................ | 715/706 |
| 8,066,571 | B2 * | 11/2011 | Koster et al. ..................... | 463/42 |
| 8,116,323 | B1 * | 2/2012 | Evans et al. ................... | 370/400 |
| 2006/0178972 | A1 * | 8/2006 | Jung et al. ........................ | 705/35 |
| 2006/0184886 | A1 * | 8/2006 | Chung et al. .................. | 715/758 |

(Continued)

FOREIGN PATENT DOCUMENTS

JP    10-105541 A    4/1998

(Continued)

OTHER PUBLICATIONS

Yu, Seok Jung; Georganas, Nicolas D.; de Oliveira, Jauvane C., "Synchronized World Embedding in Virtual Environments", IEEE Computer Graphics and Applications, IEEE, Jul./Aug. 2004, pp. 73-83.*

(Continued)

*Primary Examiner* — Mohammad W Reza
*Assistant Examiner* — Victor Lesniewski
(74) *Attorney, Agent, or Firm* — Shimokaji & Assoc., PC

(57) ABSTRACT

A method for carrying out a secure transaction in a 3D virtual space is desired from both an administrator side operating a facility and a user side. It is also desired to solve the problems such as the confidentiality of a transaction in the 3D virtual space and a phishing scam. In the present invention, a copy space of an original space of a facility in the 3D virtual space is created. Since only avatars permitted to enter the copy space can enter the copy space, a secure transaction can be carried out between the facility and a user avatar.

16 Claims, 9 Drawing Sheets

U.S. PATENT DOCUMENTS

| | | | |
|---|---|---|---|
| 2007/0070066 A1* | 3/2007 | Bakhash | 345/419 |
| 2008/0081701 A1* | 4/2008 | Shuster | 463/42 |
| 2008/0146334 A1* | 6/2008 | Kil | 463/36 |
| 2008/0148146 A1* | 6/2008 | Estrada et al. | 715/255 |
| 2008/0155019 A1* | 6/2008 | Wallace et al. | 709/204 |
| 2008/0163379 A1* | 7/2008 | Robinson et al. | 726/27 |
| 2008/0303811 A1* | 12/2008 | Van Luchene | 345/419 |
| 2009/0077158 A1* | 3/2009 | Riley et al. | 709/202 |
| 2009/0077475 A1* | 3/2009 | Koster et al. | 715/757 |
| 2009/0106671 A1* | 4/2009 | Olson et al. | 715/757 |
| 2009/0116641 A1* | 5/2009 | Bokor et al. | 380/44 |
| 2009/0119605 A1* | 5/2009 | Bokor et al. | 715/757 |
| 2009/0254434 A1* | 10/2009 | Ganz et al. | 705/14.45 |
| 2010/0081508 A1* | 4/2010 | Bhogal et al. | 463/40 |

FOREIGN PATENT DOCUMENTS

| | | |
|---|---|---|
| JP | 2001-312745 A | 11/2001 |
| JP | 2002-073513 A | 3/2002 |
| JP | 2002-229920 A | 8/2002 |
| JP | 2004-192451 A | 7/2004 |
| WO | WO 2008120988 A2 * | 10/2008 |

OTHER PUBLICATIONS

Pan, Zhigeng; Xu, Bing; Zhang, Mingming; Yang, Hongwei, "Collaborative Shopping Based on Multi-agent in Virtual Environments", The 8th International Conference on Computer Supported Cooperative Work in Design Proceedings, IEEE, 2003, pp. 386-391.*

* cited by examiner

TRANSACTION METHOD IN 3D VIRTUAL SPACE

BACKGROUND OF THE INVENTION

In a 3D virtual space typified by Second Life, users can carry out various transactions including those for provided goods or service through cartoon representations of themselves called avatars. However, for example, since everybody can get a login ID and a password on the Second Life site, they can all enter the 3D virtual space on the Second Life site in principle. Therefore, for the owner or the manager who operates a store in the 3D virtual space, it is difficult to determine that a user (as a customer) visiting the store is a harmless user. On the other hand, in the 3D virtual space, since everybody can operate a store by renting a community space from an administrator of the 3D virtual space, it is difficult for the user side to determine the authentication of the store (which can be identified as the store manager operating the store), or a server system managing the store (which can be identified as the administrator operating the server system).

In the 3D virtual space, even if a user intends to communicate with a store clerk avatar through its own avatar (hereinafter called "user avatar"), the user may communicate in such a manner that a third party avatar can hear the user without intending to do so or the third party avatar can get the transaction content. Further, the communication content with the store clerk avatar may be announced in the store. Thus, there is a problem with the confidentiality of the transaction content. Further, a malicious third party avatar may pretend to be a store clerk avatar. In such a case, the user avatar can speak to the malicious third party avatar. As a result, the user can involve in a scam such as a phishing scam in which the user gets wrong information from the malicious third party or purchases a product at a high price. Further, the store itself may be a phishing scam.

As conventional techniques, there are sites on which a link to an existing website in a 3D virtual space is so provided that users can conduct transactions on the website upon purchasing a product. In the transactions on the website, there is a protocol, for example, using an SSL (Secure Socket Layer) for encrypting information between transactors and sending/receiving it to improve the security. However, in the transaction on the website, unlike the transaction in the 3D virtual space, the user cannot view the product in three dimensions. Further, upon conducting a transaction in the 3D virtual space, since the user can have a chat or audibly communicate with a store clerk avatar through the user avatar in real time, the user can conduct a transaction in the same manner as the transaction carried out in the real world (real life). On the other hand, upon conducting a transaction on the website, the user cannot hear a store clerk in real time. Further, in the transaction on the website, the user has once to get out of the 3D virtual space onto the website, and this is operationally complicated.

Japanese Patent Application Laid-Open (Kokai) No. 2004-192451 discloses a virtual space remote control. The virtual space remote system allows users to control consumer electronic devices connected in a home network using a game-like user interface having a virtual space in such a manner to share the private virtual space among limited members. However, in the private virtual space, the user just performs access control using his or her individual ID and password.

Japanese Patent Application Laid-Open (Kokai) No. 2002-312612 discloses a virtual space providing method for realizing a virtual life. In the virtual space providing method, a virtual town space is formed in advance on a server accessible via a network, and a virtual room for a character symbolizing a user is opened in the town space. Thus, the virtual room is just built anew as part of a building within the virtual space.

Japanese Patent Application Laid-Open (Kokai) No. 2001-154966 discloses a system for supporting a virtual conversation in which a plurality of users can participate in a shared virtual space. In the conversation supporting system, even if communication partners do not exist in an identical shared virtual space, a virtual cellular phone of an avatar, a telephone in the real world, or a telephone in another virtual space is connected. In this case, the virtual cellular phone just allows avatars existing in other virtual spaces to communicate each other.

Japanese Patent Application Laid-Open (Kokai) No. 10-240966 discloses an object operation confirming method in a 3D virtual space. In the operation confirming method, a rehearsal space for confirming the operation of an object is displayed. In the rehearsal space, other objects and users to be in contact with the object upon the operation of the object are represented as simplified objects. However, the rehearsal space is provided merely for confirming the operation of the object and nothing to do with the transaction.

As still another technique, there is an example in which there is a room for business negotiation in a 3D virtual space. However, the number of business negotiation rooms is limited and this cannot be applied to a store in which goods are displayed for sale.

Japanese Patent Application Laid-Open (Kokai) No. 2004-192451, Japanese Patent Application Laid-Open (Kokai) No. 2002-312612, Japanese Patent Application Laid-Open (Kokai) No. 2001-154966, Japanese Patent Application Laid-Open (Kokai) No. 10-240966, and Japanese Application No. 2007-302801 filed Nov. 22, 2007 are examples of the related art.

SUMMARY OF THE INVENTION

In one embodiment of the present invention, a method for conducting a transaction, in at least one server system connected to at least one client system through a computer network, between a first avatar associated with a user of the client system in a 3D virtual space provided by the server system and a facility provided by the server system, the method comprising the steps of: allowing the server system to send the client system, in response to receiving a user request from the client system to permit the first avatar to enter the facility, object data and first avatar data for a space within the requested facility (hereinafter called the original space of the facility), and if necessary, second avatar data associated with the facility stored in a storage device of the server system; allowing the server system to confirm, in response to receiving a user request from the client system to copy the original space of the facility in order to generate a copy space of the facility, whether the first avatar and the second avatar can enter the copy space according to an access right list for the copy space of the facility stored in the storage device; and allowing, if they can enter, the server system to send the client system the object data, first avatar data, and second avatar data for the copy space of the facility stored in the storage device of the server system, wherein the first avatar and the second avatar can conduct a transaction in the copy space of the facility.

In another embodiment of the invention, a server system including at least one server system connected to at least one client system through a computer network to carry out a transaction between a first avatar associated with a user of the client system and a facility provided by the server system in a 3D virtual space provided by the server system, the server system comprising: means for sending the client system, in response to receiving a user request from the client system to permit the first avatar to enter the facility, object data and first avatar data for a space within the requested facility (hereinafter called the original space of the facility), and if necessary, second avatar data associated with the facility; means for confirming, in response to receiving a user request from the client system to copy the original space of the facility in order to generate a copy space, whether the first avatar and the second avatar can enter the copy space according to an access right list for the copy space of the facility; means for sending the client system, if they can enter, object data, first avatar data, and second avatar data for the copy space of the facility; and a storage device for storing the object data, the first avatar data, and the second avatar data for the original space of the facility, the object data, the first avatar data, and the second avatar data for the copy space of the facility, and the access right list for the copy space of the facility, wherein the first avatar and the second avatar can conduct a transaction in the copy space of the facility.

In another embodiment of the invention, a program product for causing at least one server system connected to at least one client system through a computer network to conduct a transaction between a first avatar associated with a user of the client system in a 3D virtual space provided by the server system and a facility provided by the server system, the program product allowing the server system to execute the steps according to any one of claims 1 to 8.

These and other features, aspects and advantages of the present invention are better understood with reference to the following drawings, description and claims.

DETAILED DESCRIPTION

Figure 1:
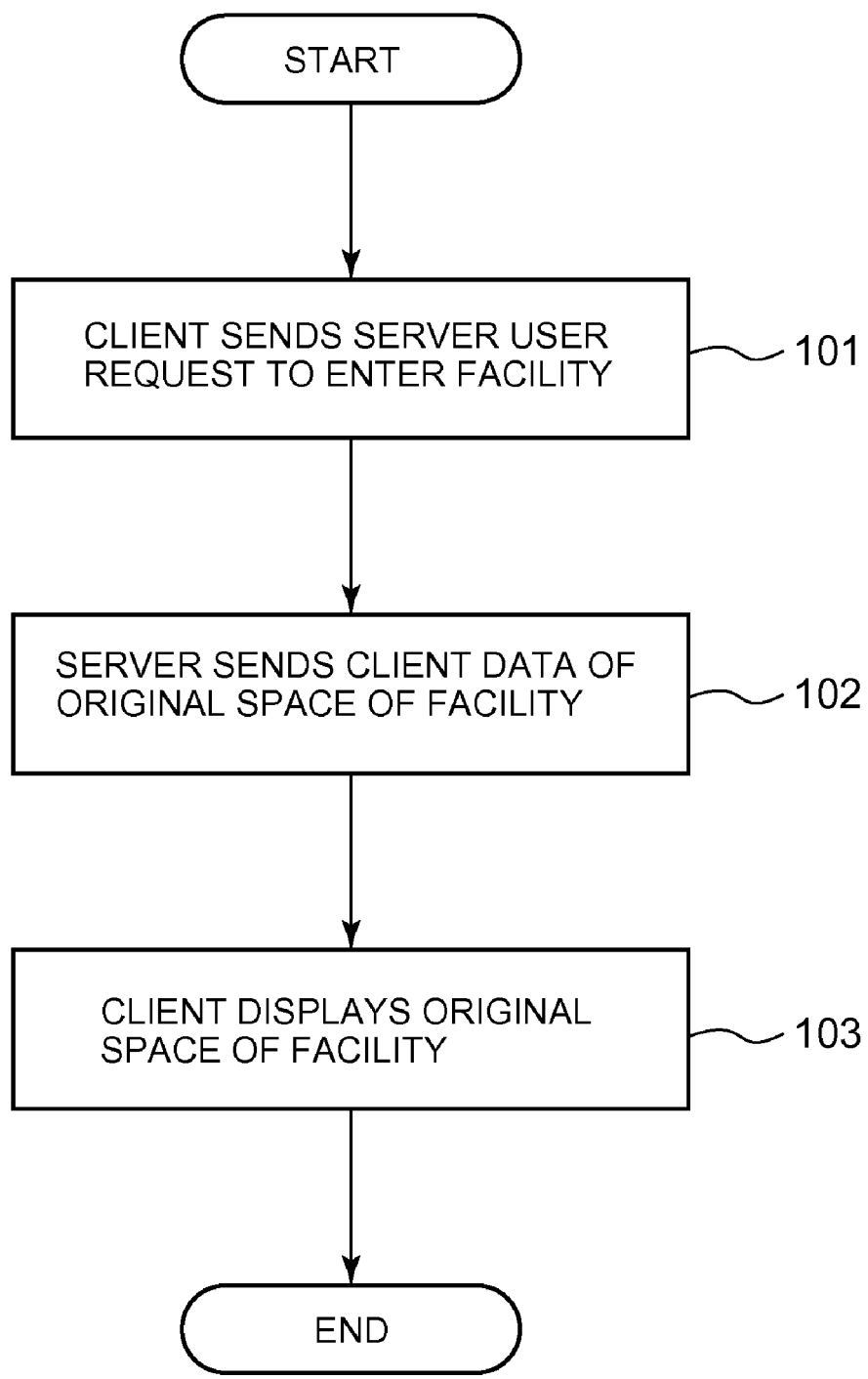
FIG. 1 is a flowchart for displaying an original space of a facility, as shown in FIG. 8, in accordance with the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention may provide a method of carrying out a transaction, in at least one server system connected to at least one client system through a computer network, between a first avatar associated with a user of the client system in a 3D virtual space provided by the server system and a facility provided by the server system.

The method may comprise a step of allowing the server system to send the client system, in response to a user request from the client system to permit the first avatar to enter the facility, object data and first avatar data for a space within the requested facility (hereinafter called the original space of the facility), and if necessary, second avatar data associated with the facility stored in a storage device of the server system;

and may further comprise a step of allowing the server system to confirm, in response to receiving a user request from the client system to copy the original space of the facility and generate a copy space of the facility, whether the first avatar and the second avatar can enter the copy space according to an access right list for the copy space of the facility stored in the storage device; and and may further comprise a step of allowing, if they can enter, the server system to send the client system the object data, the first avatar data, and the second avatar data for the copy space of the facility stored in the storage device of the server system.

By executing the above steps to create the copy space, the first avatar and the second avatar can conduct a transaction in the copy space of the facility.

In response to sending the client system the object data and the first avatar data for the original space of the facility, and if necessary, the second avatar data associated with the facility, the client system can receive the object data, the first avatar data, and the second avatar data for the original space of the facility to display the received data on a display device connected to the client system.

Then, in response to sending the client system object data, first avatar data, and second avatar data for the copy space of the facility, the client system can receive the object data, the first avatar data, and the second avatar data for the copy space of the facility to display the received data on the display device connected to the client system.

If the first avatar and the second avatar cannot enter the copy space of the facility, the server system sends the client system an error message that the copy space cannot be created. Then, the error message may be displayed on the display device connected to the client system or notified as a voice message to the user.

The server system of the present invention can further comprise a step of receiving a user request from the client system to confirm if the facility or the server system providing the facility is authentic. As viewed from the client side system, the present invention further may comprise a step of allowing the client system to confirm if the facility or the server system providing the facility is authentic in response to a user request to copy the original space of the facility in order to generate a copy space of the facility.

The method of the present invention can further comprise: a step of allowing the server system to confirm, in response to receiving a second user request from another client system to permit a third avatar associated with the first avatar to enter the copy space of the facility, whether the third avatar can enter the copy space according to an access right list for the copy space of the facility stored in the storage device; and may further comprise a step of allowing the server system to send the other client system, if the third avatar can enter the copy space of the facility, object data, first avatar data, second avatar data, and third avatar data for the copy space of the facility stored in the storage device of the server system, and further send the one client system third avatar data for the copy space of the facility. By executing the steps, the other client system may receive the object data, the first avatar data, the second avatar data, and the third avatar data for the copy space of the facility to display them on a display device connected to the other client system, and the one client system receives the third avatar data for the copy space of the facility to display it on the display device connected to the client system.

The method of conducting the transaction can be executed by a computer readable program. The program can be distributed separately for the client system and the server system, or distributed as a bundle of client system and server system. In either case, the program can be executed on a client system or a server system. As one aspect, the program is distributed by recording it on a computer readable recording medium such as CD-ROM and DVD-ROM. As another aspect, the program is stored in a storage device of the server system in such a manner to be able to download it from the server system through a communication line according to a request from the client system or the server system.

The present invention also may provide a server system composed of at least one server system connected to at least one client system through a computer network to carry out a transaction between a first avatar associated with a user of the client system and a facility provided by the server system in a 3D virtual space provided by the server system.

The server system may comprise: means for sending the client system, in response to receiving a user request from the client system to permit the first avatar to enter the facility, object data and first avatar for a space within the requested facility (hereinafter called the original space of the facility), and if necessary, second avatar data associated with the facility;

may further comprise means for confirming, in response to receiving a user request from the client system to copy the original space of the facility in order to generate a copy space, whether the first avatar and the second avatar can enter the copy space according to an access right list for the copy space of the facility;

may further comprise means for sending the client system, if they can enter, object data, first avatar data, and second avatar data for the copy space of the facility; and may further comprise a storage device for storing the object data, the first avatar data, and the second avatar data for the original space of the facility, the object data, the first avatar data, and the second avatar data for the copy space of the facility, and the access right list for the copy space of the facility. By creating the copy space, the first avatar and the second avatar can conduct a transaction in the copy space of the facility.

The client system connected to a display device may comprise means for displaying, on the display device, the object data, the first avatar data, and the second avatar data for the original space sent from the server system and/or the object data, the first avatar data, and the second avatar data for the copy space sent from the server system.

The server system further may comprise means for sending the client system an error message that the copy space cannot be created when the first avatar and the second avatar cannot enter the copy space of the facility. The client system receiving the error message may further comprise means for displaying the error message on the display device connected to the client system, or means for notifying the user of the error message as a voice message.

The server system of the present invention may further comprise means for receiving a user request from the client system to confirm whether the facility or the server system providing the facility is authentic. As viewed from the client system side, the client system of the present invention may comprise means for confirming if the facility or the server system providing the facility is authentic in response to the user request to copy the original space of the facility in order to generate a copy space of the facility.

The server system of the present invention may further comprise: means for confirming, in response to receiving a second user request from another client system to permit a third avatar associated with the first avatar to enter the copy space of the facility, whether the third avatar can enter the copy space according to the access right list for the copy space of the facility stored in the storage device; and may further comprise means for sending the other client system, if the third avatar can enter the copy space of the facility, object data, first avatar data, second avatar data, and third avatar data for the copy space of the facility stored in the storage device of the server system, and further sending the one client the third avatar data for the copy space of the facility. Since the third avatar can enter the copy space, the other client system can receive the object data, the first avatar data, the second avatar data, and the third avatar data for the copy space of the facility to display the data on a display device connected to the other client system. Further, the one client system can receive the third avatar data for the copy space of the facility to display the data on the display device connected to the client system.

According to the present invention, a copy space of the original space of the facility in the 3D virtual space may be created. Since only the avatars permitted to enter the copy space can enter the copy space, a secure transaction can be carried out between the facility (which can be identified as an administrator operating the facility) and the user avatar (which can be identified as the user).

The following describes the original space and the copy space, respectively, while describing a method of displaying the original space and the copy space on a display device.

The original space here means a space displayed by default on the display device upon entering the 3D virtual space. The display of the original space on the display device connected to a client system may be provided by sending display information from a server system to the client system. The display information of the original space may be stored in each storage device of the server system and the client system.

Figure 4:
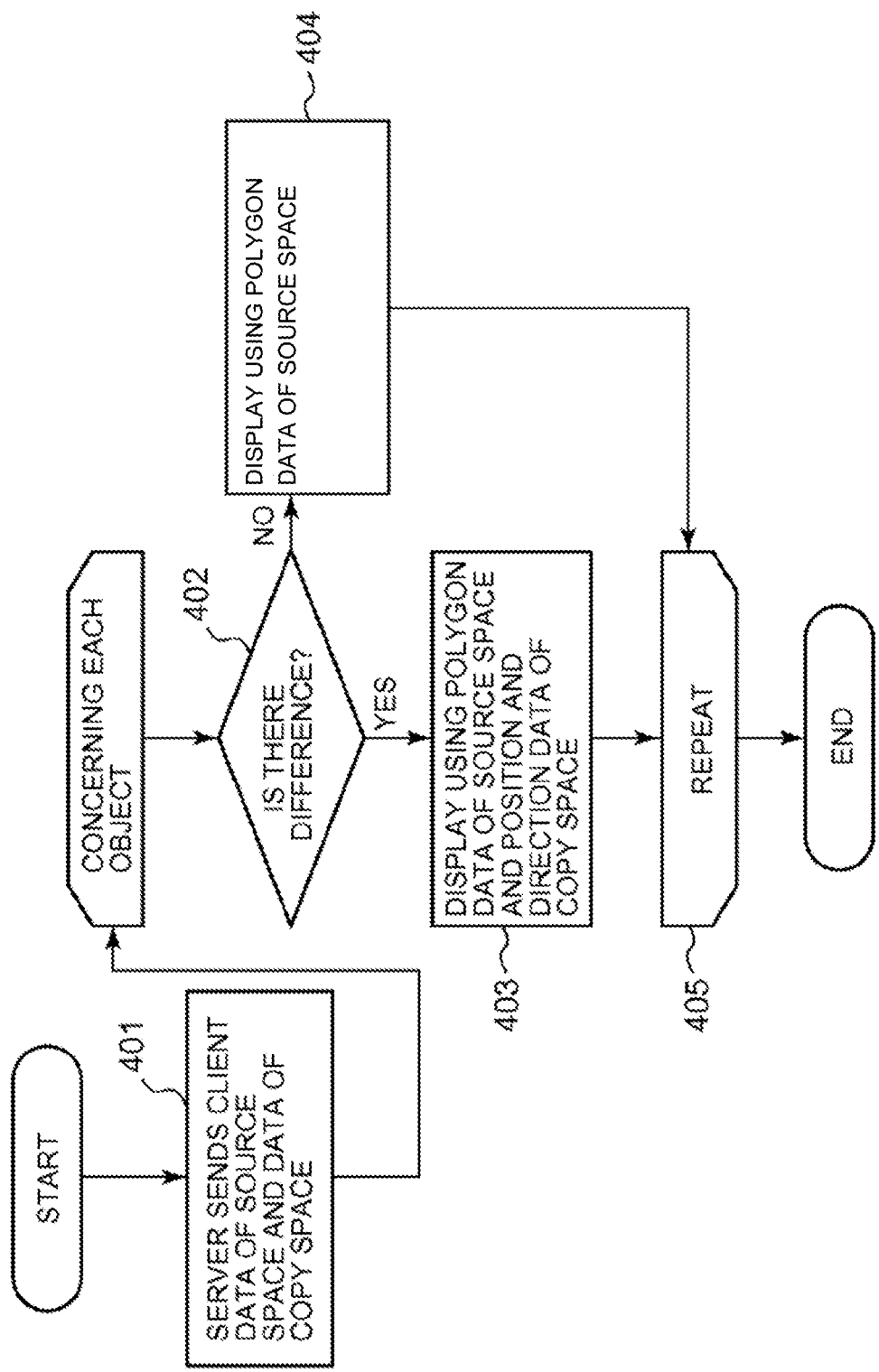
FIG. 4 is a flowchart for displaying the copy space of the facility, as shown in FIG. 8, in accordance with the present invention.

The objects in the copy space are displayed, for example, according to steps shown in FIG. 4.

The server system sends the client system data of the source space and data of the copy space stored in its storage device (step 401). The client system receives the data and confirms from each data for the copy space if there is difference data for each object data. If there is difference data (Yes in step 402), a corresponding object is displayed on the display device connected to the client system using the polygon data of the object for the source space and the position and direction data of the object in the copy space (step 403). On the other hand, if there is no difference data (NO in step 402), the object is displayed on the display device connected to the client system using the polygon data of the object of the source space (step 404). The above steps are repeated until all the objects are displayed (step 405).

The objects in the original space are displayed according to the same method as that of displaying the objects in the copy space.

The copy space may be a new space created by a user request, which is synonymous with a copy of the original space at a time point. In the server system, the copy space may be created by allocating a main memory area and copying the avatars and objects thereto.

If the copy space is created once, the copy space may exist independently of the original space. However, the copy space may exist temporarily in the 3D virtual space, not permanently. In the copy space, avatars may be displayed in addition to objects. However, the copy space may be different from the original space in that the displayed avatars may be limited by an access right list.

First, an example of the original space display of the facility will be described below.

To display the original space of the facility, data of a source space of the facility may be created. The source space data of the facility may be created in such a manner that an administrator operating the facility sends an instruction to copy the data of the original space of the facility at any time, i.e., each data of the objects and the avatars, from a computer system of the administrator to the server system, or directly to the server system. Therefore, at the time of copying the data of the original space, the object data and the avatar data in the original space as a copy source can be the same as those in the source space as the copy destination. The server system can be set to automatically update the source space data periodically or at any time intervals. The source space data and the original space data may be stored in a storage device of the server system, such as a hard disk (HDD) or a solid state drive (SSD). When the source space data is created, the original space data may be represented as difference data from the source space data on and after that time. Therefore, to display the original space, the source space data (object polygon data and avatar polygon data to be described later), and the difference data, for example, data on the position and direction of each object and data on the position and direction of the each avatar may be used. Use of the difference data makes it possible to reduce the amount of data communication for displaying the original space sent from the server system to the client system.

The object data and the avatar data can be included as data of the source space.

The object data for the source space can be represented as an object table, for example, as shown later. The object table for the source space (see Table 1 below) includes an object number associated with each object, polygon data associated with each object number, and position and direction data associated with each object number.

The avatar data of the source space can be represented as an avatar table, for example, as shown later. The avatar table for the source space (see Table 2 below) includes an avatar number associated with each avatar and polygon data associated with each avatar number. The avatar table for the source space does not include position and direction data associated with each avatar number. The position and direction data associated with each avatar number may be included in an avatar table for the original space to be described later.

The data of the source space can be globally shared among the server system managing the facility, other server systems, and users' client systems. For example, in response to a request to the server system to permit a user to enter the facility, the data of the source space of the facility can be sent to another server system and/or at least one client system.

TABLE 1

Object Table for Source Space

| Object Number | Polygon data | Position and Direction Data |
|---|---|---|
| 1 | {polygon, texture, ...} | {x = 0, y = 0, z = 0, view vector, ...} |
| ... | ... | ... |
| n | {polygon, texture, ...} | {x = 5, y = 10, z = 5, view vector, ...} |

TABLE 2

Avatar Table for Source Space

| Avatar Number | Polygon data |
|---|---|
| 1 | {polygon, texture, ...} |
| ... | ... |
| n | {polygon, texture, ...} |

The object data and the avatar data can be included as data of the original space.

An access right list for the original space can also be included as data of the original space. The access right list can be either included or excluded as data of the original space.

The object data for the original space can be represented as an object table, for example, as shown later. The object table for the original space (see Table 3 below) includes an object number associated with each object, and position and direction data associated with each object number. Unlike the object table for the source space, the object table for the original space does not include polygon data associated with each object number. This is because the polygon data in the object table for the source space may be used as the polygon data of the object upon displaying the original space. The position and direction data in the object table for the original space may be difference data from the object data for the source space. Thus, since the object may be displayed in the original space, the polygon data in the object table for the source space and the position and direction data for the original space may be at least required for each object.

The avatar data of the original space can be represented as an avatar table, for example, as shown later. The avatar table for the original space (see Table 4 below) includes an avatar number associated with each avatar, and position and direction data associated with each avatar number. Unlike the avatar table of the source space, the avatar table for the original space does not include polygon data associated with each avatar number. This is because the polygon data in the avatar table for the source space may be used as the polygon data of the avatar upon displaying the original space. The position and direction data in the avatar table for the original space may be difference data from the avatar data of the source space. Thus, since the avatar may be displayed in the original space, the polygon data in the avatar table for the source space and the position and direction data for the original space may be at least required for each avatar.

The access right list for the original space (see Table 5 below) includes an avatar number, operation items approved in association with the avatar number, and operation items disapproved. One avatar may be assigned an avatar number unique to the avatar. Depending on the kind of avatar, i.e., depending on whether it is a user (customer) avatar or a store clerk avatar, the contents of the approved operation items and the contents of the disapproved operation items can vary. The operation items can include, but not limited to, entry to the facility, transaction, and script operation. For example, the store clerk avatar may be allowed to perform a script operation as access control for the 3D virtual space, but the user avatar can be limited or not allowed to perform the script operation. This is because, if script operations performed by the user avatar within the original space are not limited, objects in the original space or the access right list for the original space could be tampered and security could be endangered.

TABLE 3

Object Table for Original Space

| Object Number | Position and Direction Data |
|---|---|
| 1 | {x = 2, y = 4, z = 2, view vector, ... } |
| ... | ... |
| n | {x = 10, y = 20, z = 2, view vector, ... } |

TABLE 4

Avatar Table for Original Space

| Avatar Number | Position and Direction Data |
|---|---|
| 1 | {x = 2, y = 3, z = 5, view vector, ... } |
| ... | ... |
| n | {x = 10, y = 15, z = 25, view vector, ... } |

TABLE 5

Access Right List for Original Space

| Avatar Number | Approval | Disapproval |
|---|---|---|
| 1 | Entry to Facility, Transaction, ... | Script Operation, ... |
| ... | ... | ... |
| n | ... | ... |

The following describes the display of a copy space of the facility.

The data of the source space for the facility can be used to display a copy space of the facility. The data of the copy space may be represented as difference data from the data of the source space. To display the copy space, the data of the source space (the polygon data of the object and the polygon data of the avatar) and the difference data, e.g., the position and direction data of the object and the position and direction data of the avatar, may be used. The use of the difference data can reduce the amount of data communication sent from the server system to the client system to display the copy space.

If the source space is not used to display the copy space, an object moving in the original space also moves in the copy space. Therefore, there happens such a strange thing that the object moves as it likes in the copy space, i.e., like an invisible man moves the object. This is because, if the object data for the original space is directly referred to for the object display in the copy space, the movement of the object in the original space, i.e., a change in the object data may be directly reflected on the object data of the copy space. However, the introduction of the source space can prevent the object moving in the original space from moving in the copy space as well.

Data of the copy space can include object data, avatar data, and an access right list.

The object data for the copy space can be represented as an object table, for example, as shown later. The object table for the copy space (see Table 6 below) includes an object number associated with each object, and position and direction data associated with each object number. Unlike the object table for the source space, the object table for the copy space does not include polygon data associated with each object number. This is because the polygon data in the object table for the source space may be used as polygon data of an object upon displaying the copy space. The position and direction data in the object table for the copy space is difference data from the object data for the source space. Thus, since the object can be displayed in the copy space, the polygon data in the object table for the source space and the position and direction data for the copy space can be at least required for each object.

The avatar data of the copy space can be represented as an avatar table, for example, as shown later. The avatar table for the copy space (see Table 7 below) includes an avatar number associated with each avatar and position and direction data associated with each avatar number. Unlike the avatar table of the source space, the avatar table of the copy space may not include polygon data associated with each avatar number. This is because the polygon data in the avatar table for the source space can be used as the polygon data of the avatar upon displaying the copy space. The position and direction data in the avatar table for the copy space is difference data from the avatar data of the source space. Thus, since the avatar can be displayed in the copy space, the polygon data in the avatar table for the source space and the position and direction data for the copy space may be at least required for each avatar.

An access right list for the copy space (see Table 8 below) includes an avatar number, and approved operation items and disapproved operation items associated with the avatar number. The access right list for the original space and the access right list for the copy space can be contained in the same table, or created separately as different tables. The operation items can include, but may not be limited to, creation of a copy space, entry to the copy space, transaction, entry of a friend avatar to the copy space, and script operation. For example, it can be set that facilities other than the facility approved by an administrator operating the facility to create a copy space cannot be copied. Depending on the kind of avatar, i.e., depending on whether it is a user (customer) avatar, a store clerk avatar, a friend avatar (to be described below) of the user avatar, and a third party avatar, the contents of the approved operation items and the contents of the disapproved operation items can vary. For example, the store clerk avatar can be allowed to perform a script operation as access control for the 3D virtual space, but the user avatar (and its friend avatar) can be limited or not allowed to perform the script operation. This is because, if script operations performed by the user avatar (and its friend avatar) within the copy space are not limited, objects in the copy space or the access right list for the copy space could be tampered and security could be endangered.

TABLE 6

Object Table for Copy Space

| Object Number | Position and Direction Data |
|---|---|
| 1 | {x = 2, y = 4, z = 2, view vector, ... } |
| ... | ... |
| n | {x = 10, y = 20, z = 2, view vector, ... } |

TABLE 7

Avatar Table for Copy Space

| Avatar Number | Position and Direction Data |
|---|---|
| 1 | {x = 2, y = 3, z = 5, view vector, . . . } |
| ... | ... |
| n | {x = 10, y = 15, z = 25, view vector, . . . } |

TABLE 8

Access Right List for Copy Space

| Avatar Number | Approval | Disapproval |
|---|---|---|
| 1 | Creation of Copy Space, Entry to Copy Space, Transaction, Entry of Friend Avatar to Copy Space, . . . | Script Operation, . . . |
| ... | ... | ... |
| n | ... | ... |

As stated above, the data of the source space may be used upon displaying both the original space and the copy space. Thus, even if both spaces are displayed at the same time on a display device of the user's client system or a server system of the administrator operating the facility, it is advantageous that memory penalty of the client system or the server system can be minimized.

The copy space may have the following features.

Only the avatar(s) approved in the access right list (Table 8) for the copy space can enter the copy space. In principle, the access right list is so set that any avatar other than one user avatar requesting to create one copy space and a store clerk avatar admitted by the administrator operating the facility cannot enter the copy space. Since such a limit can be set, any third party avatar may be restricted not to enter the copy space.

Further, actions permitted for the user avatar can be defined as the operation items in the access right list for the copy space. Therefore, the actions that the user avatar can take are limited in the copy space to the actions approved by the administrator operating the facility.

Further, since the original space and the copy space exist independently, an avatar in the original space cannot glance into the copy space. Therefore, the avatar in the original space cannot see the transaction in the copy space.

Thus, according to the present invention, since a transaction can be carried out in a copy space, the confidentiality and phishing scam problems can be solved, and hence the security of the transaction in the 3D virtual space can be confirmed.

Since the copy space can be created as many as requests from the user avatar, or customer avatar, the number of copy spaces is not limited in principle. Therefore, unlike the rooms for business negotiation in the conventional example, the number of spaces available for secure transactions in the 3D virtual space is not limited. However, the administrator operating the facility can limit the number of copy spaces in consideration of the number of store clerk avatars controllable by a store clerk in the real world.

The following describes a control method from when a user enters a 3D virtual space until the user conducts a transaction in due order with reference to FIGS. 1 to 9.

User's actions in the 3D virtual space may be taken through a user avatar. In the following, the user's actions may be user avatar's actions in the 3D virtual space.

The user boots a web browser or dedicated software for 3D virtual space on the client system to log in the 3D virtual space. A conventional method is used as the login method. For example, upon login, the user manually enters a user ID and a password associated with the user in predetermined fields on the web browser or the dedicated software through an input device, for example, a keyboard. Alternatively, the user can perform control (e.g., script control) to automatically input, to the web browser or the dedicated software, the user ID and the password stored in a storage device of the client system, such as a hard disk (HDD) or a solid state drive (SSD). In this case, the user ID and the password are preferably encrypted and stored in the storage device of the client system. When the input user ID and password are approved by a server system managing the entry (log in) to the 3D virtual space, the user can let an avatar of himself or herself enter (display in) the 3D virtual space. The 3D virtual section that the avatar has entered is the original space. The 3D virtual space can be displayed on a display device connected to the user's client system. Client systems include, but may not be limited to, personal computers, personal digital assistants (PDAs), game machines, and cellular phones.

If the user desires a transaction at a facility in the 3D virtual space, the user avatar can be let into the space in the facility (original space in the facility). Facilities include, but may not be limited to, retailers providing goods, such as retail stores, supermarkets, and department stores, and facilities offering services, such as lecture rooms, auction houses, art museums, movie theaters, and banks. Transactions can include providing goods existing in the 3D virtual space or the real world, and offering services existing in the 3D virtual space or the real world, such as lectures, auctions, art museums, movie theaters, and furnishing places (e.g., meeting rooms, gyms, dance studios). The number of places furnished in the 3D virtual space is not limited.

When the user avatar enters the facility, objects, the user avatar, and a store clerk avatar belonging to the facility can be displayed in the facility. The store clerk avatar may not be in the facility immediately after the user avatar enters the facility. Or, the store clerk avatar may be spoken to by the user avatar into the facility to display the store clerk avatar. Further, a third party avatar(s) other than the user avatar may be in the facility. The third party avatars include other user avatars. The store clerk avatar may not be one, and two or more store clerk avatars can be in the facility. The objects in the facility include all the objects that can form the interior of the facility, such as furniture in the facility, electric appliances, products to be dealt with, and goods related to products or services like brochures.

The original space of the facility can be displayed, for example, according to steps shown in FIG. 1.

In response to receiving input of a user's request to enter the facility, the client system sends the request to a server system managing the facility (step 101). In response to receipt of the request, the server system sends, to the client system associated with a user avatar coming into the facility, object data for the original space of the facility, user avatar data, and if necessary, store clerk avatar data (step 102). As mentioned above, since the store clerk avatar may not be in the facility immediately after the user avatar has come into the facility, the server system does not need to send the client system the store clerk avatar data according to the request from the user. Then, in response to a request from the client system to permit the user avatar to speak to the store clerk avatar, the server system sends the client system the store clerk avatar data according to the request from the user. The client system reconstructs an original space of the facility based on the sent object data, user avatar data, and store clerk avatar data for the original space of the facility to display the original space of the facility on the display device connected to the client system (step 103).

When needing a secure transaction with the facility, the user can request the facility, i.e., the server system managing the facility to copy the original space of the facility in order to create a copy space. Like the original space, the copy space may be the space where there are avatars in addition to the objects. However, the copy space can be different from the original space in that there are only the avatars approved in the access right list. The avatars approved in the access right list may be an avatar(s) (e.g., a store clerk avatar) admitted by the administrator operating the facility, and an avatar(s) (e.g., a user avatar and its friend avatar) admitted by the user requesting to create the copy space.

Figure 2:
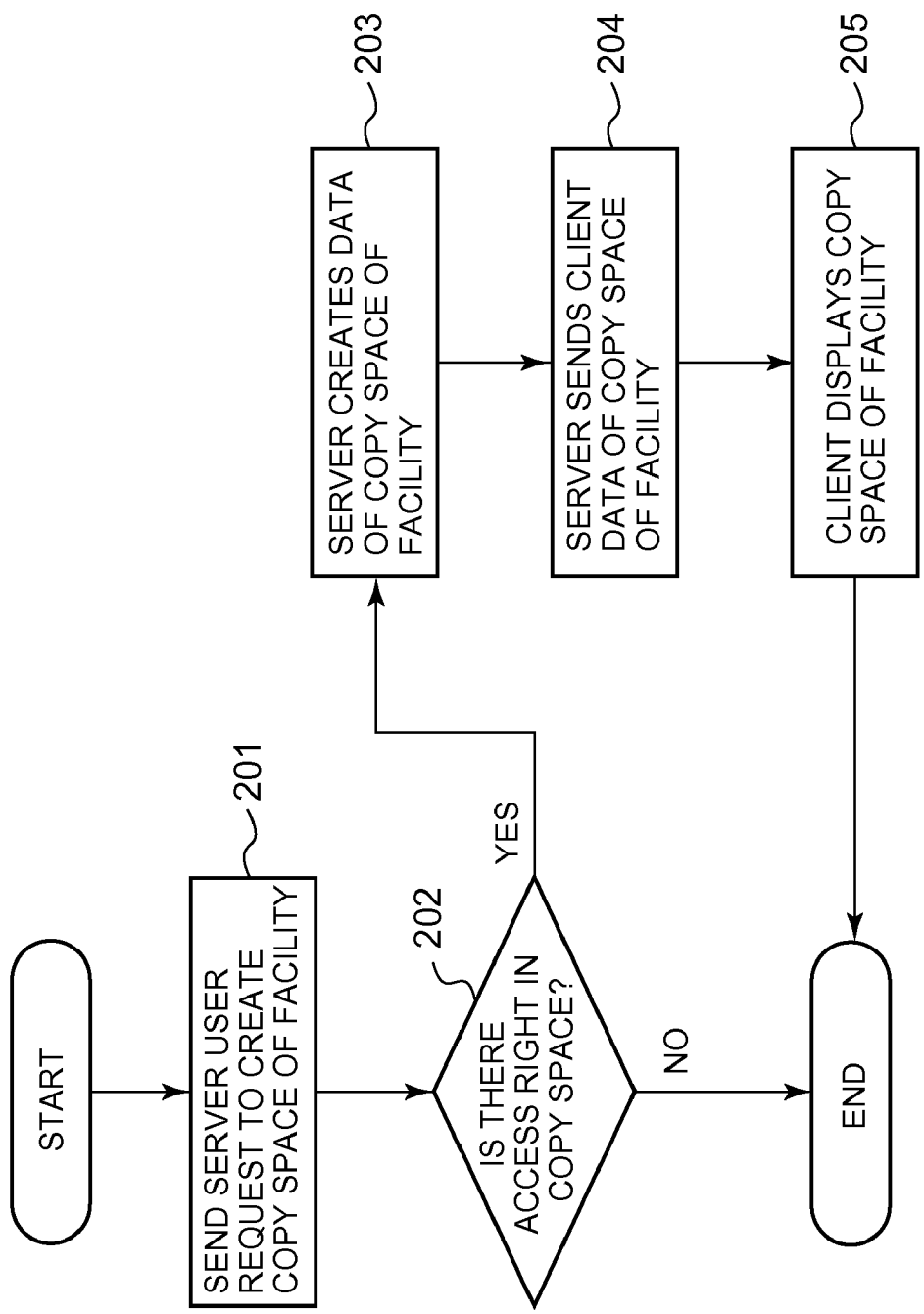
FIG. 2 is a flowchart for displaying a copy space of the facility, as shown in FIG. 8, in accordance with the present invention.

One embodiment of displaying the copy space of the facility will be described according to steps shown in FIG. 2. When wanting to conduct a transaction with the facility, the user requests the server system to create the copy space of the facility (step 201). As one aspect, the request is originated by selecting a menu display item, e.g., "Create Copy Space," displayed on the display device connected to the user's client system using an input device such as a mouse. As another aspect, the request is originated by a user's voice instruction to the client system, e.g., by saying "Create copy space." The user's request can be sent from the client system to the server system managing the facility. In response to the user's request, the server system checks the access right list for the copy space to confirm if the user avatar and the store clerk avatar have a right to enter the copy space (step 202). The store clerk avatar to be copied into the copy space can be predetermined by the administrator operating the facility. Alternatively, it can be the store clerk avatar communicating with the user before the user requests to create the copy space of the facility. In either case, the server system checks the access right list for the copy space to confirm if the store clerk avatar has the right to enter the copy space. If both the user avatar and the store clerk avatar have the right to enter the copy space, the server system can create data of the copy space (step 203). The data of the copy space may be stored in a storage device of the server system. On the other hand, if both or either of the user avatar and the store clerk avatar does not have the right to enter the copy space, the server system can reject the creation of the copy space. Then, a message of rejection may be sent from the server system to the client system, and displayed on the display device connected to the client system or notified the user as a voice message. Returning to step 203, when the data of the copy space is created, the server system can send object data, user avatar data, and store clerk avatar data for the copy space of the facility to the client system associated with the user avatar coming into the facility (step 204). The client system can reconstruct the copy space of the facility based on the sent object data, user avatar data, and store clerk avatar data for the copy space of the facility in order to display the copy space of the facility on the display device connected to the client system (step 205).

According to the above method, since the administrator operating the facility can control the user's access right to conduct a transaction, a secure transaction can be carried out.

Figure 3:
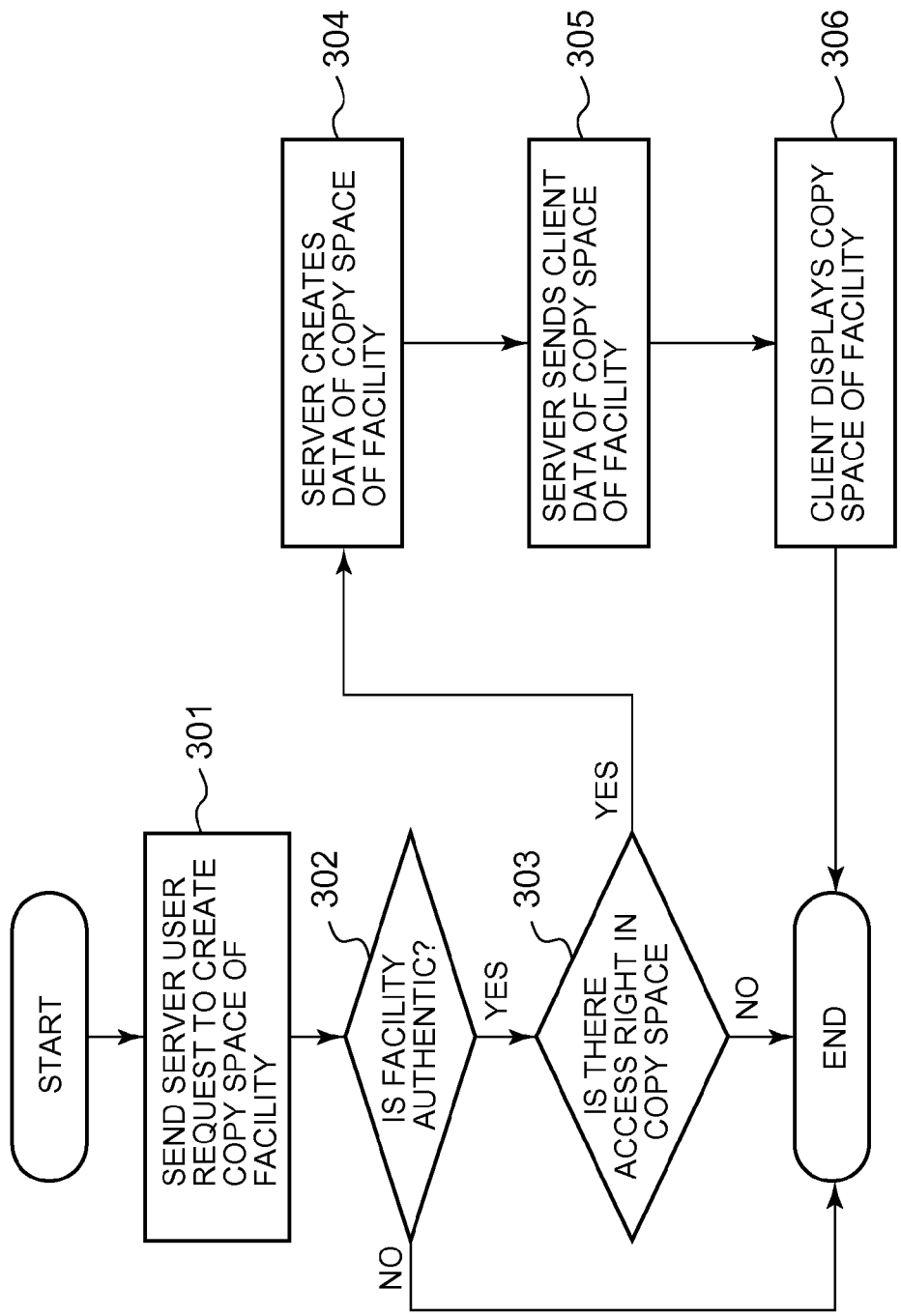
FIG. 3 is a flowchart for displaying objects in the copy space of the facility, as shown in FIG. 8, in accordance with the present invention.

Another embodiment of displaying the copy space of the facility will be described according to steps shown in FIG. 3.

When wanting to conduct a transaction with the facility, the user can request the server system to create the copy space of the facility (step 301). The request can be the same as mentioned above. In response to the user's request, the client system may confirm if the facility or the server system managing the facility is authentic (step 302). Since this can perform authentication to confirm if the facility or the server system managing the facility is authentic (genuine), it is effective in the case that the facility itself is a phishing scam. To confirm if the facility is authentic, an authentication system, for example, a public key encryption system can be used. The following shows an example:

1. The client system may request, through its browser, the server system managing the facility to perform authentication;

2. The server system receiving the request can send an application for a certificate to the system of a certification authority;

3. In response to the application from the server system, the system of the certification authority (CA) can issue a certificate encrypted with a private key of the certification authority;

4. The server system may send the client system the certificate and the public key of the server system; and 5. The browser of the client system decodes the certificate using the public key of the certification authority to determine whether the server system can be trusted.

Optionally, if the facility is authentic, a channel capable of performing SSL communication between the client system and the server system managing the facility can be created at the same time to encrypt the communication content. Specifically, following the above procedures 1 to 5, procedures shown below are performed:

6. The client system can generate a common key at random;

7. The client system may encrypt the generated common key with the public key of the server system and sends it to the server system;

8. The server system may decode the encrypted common key from the client system using a private key of the server system; and 9. The server system and the client system can communicate while encrypting the communication content using the common key as the encryption key.

Next, if the facility is authentic, the server system can check the access right list for the copy space if the user avatar and the store clerk avatar have the right to enter the copy space (step 303). On the other hand, if the facility is not authentic, i.e., if the facility is a false facility, the copy space may not be created. The client system displays a message (as a warning), indicating that the copy space cannot be created because the facility is not authentic, on the display device connected to the user's client system, or notified the user as a voice message.

If the user avatar and the store clerk avatar have the right to enter the copy space, the server system creates data of the copy space (step 304). The data of the copy space can be stored in the storage device of the server system. On the other hand, if both or either of the user avatar and the store clerk avatar does not have the right to enter the copy space, the server system may reject the creation of the copy space. Then, a message of rejection is sent from the server system to the client system, and displayed on the display device connected to the client system or notified the user as a voice message. Returning to step 304, when the data of the copy space is created, the server system can send object data, user avatar data, and store clerk avatar data for the copy space of the facility to the client system associated with the user avatar coming into the facility (step 305). The client system can reconstruct the copy space of the facility based on the sent object data, user avatar data, and store clerk avatar data for the copy space of the facility in order to display the copy space of the facility on the display device connected to the client system (step 306).

According to the above method, since the administrator operating the facility can control the user's access right to conduct a transaction, a secure transaction with the user can be carried out. On the other hand, since the user can confirm that the facility with which the user conducts the transaction is authentic, the user may not need to worry about the problems of the phishing scam by the facility and the like.

The objects in the copy space can be displayed, for example, according to steps shown in FIG. 4.

The server system can send the client system data of the source space and data of the copy space stored in its storage device (step 401). The client system may receive the data and confirms from each data for the copy space if there is difference data for each object data. If there is difference data (Yes in step 402), a corresponding object can be displayed on the display device connected to the client system using the polygon data of the object for the source space and the position and direction data of the object in the copy space (step 403). On the other hand, if there is no difference data (NO in step 402), the object may be displayed on the display device connected to the client system using the polygon data of the object of the source space and the position and direction data of the object of the copy space (step 404). The above steps are repeated until all the objects are displayed (step 405).

The objects in the original space can be displayed according to the same method as that of displaying the objects in the copy space.

The avatars in the copy space can be displayed according to steps to be described below.

The server system may send the data of the source space and the data of the copy space from its storage device to the client system. The client system can receive the data and may display an avatar on the display device connected to the client system using the polygon data of the avatar of the source space and the position and direction data of the avatar of the copy space.

The avatar in the original space may be displayed according to the same method as that of displaying the avatar in the copy space.

A relationship between the original space and the copy space will be described below.

Figure 5:
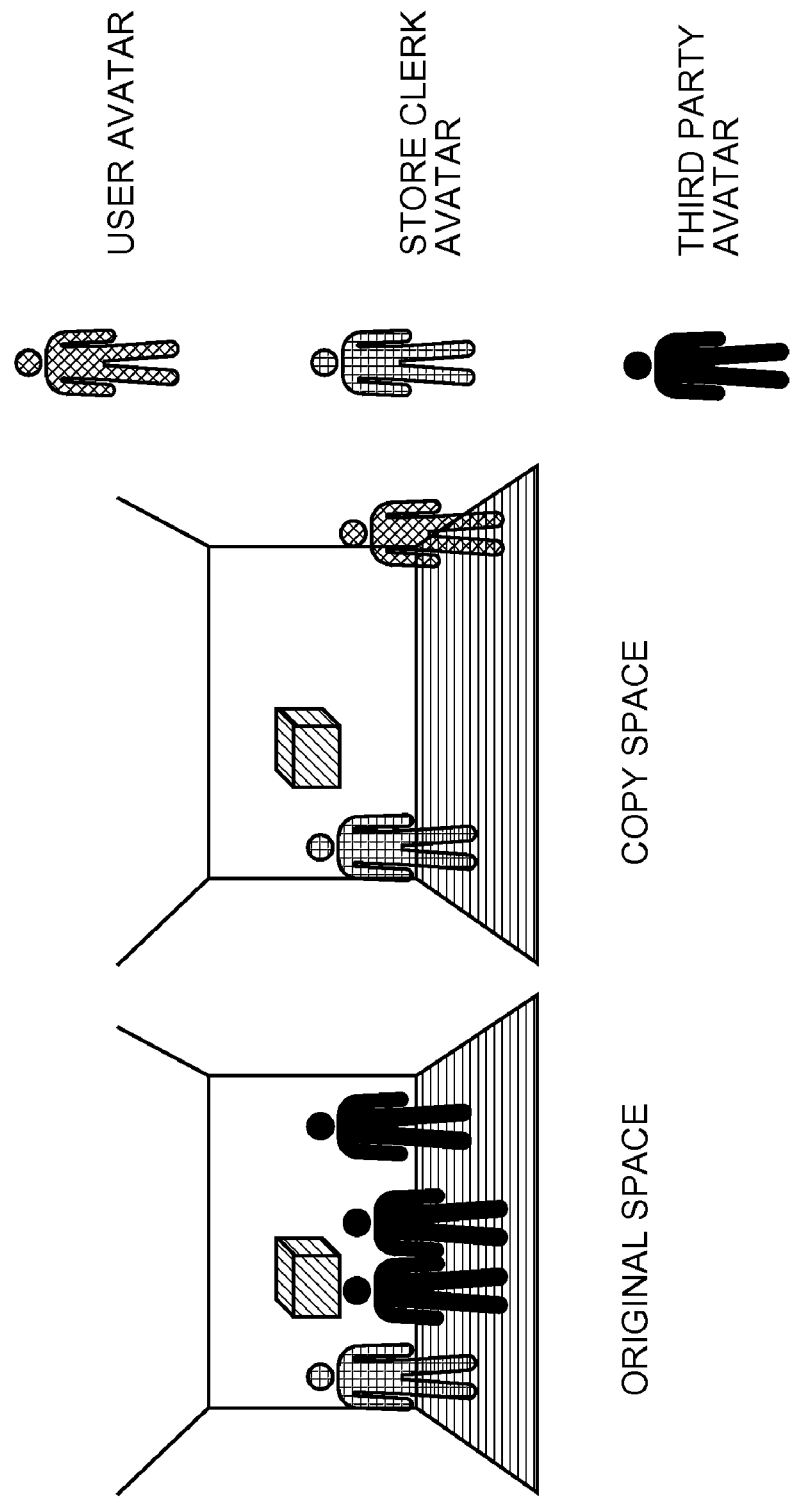
FIG. 5 shows a relationship between the original space and the copy space, in accordance with the present invention.
Figure 6A:
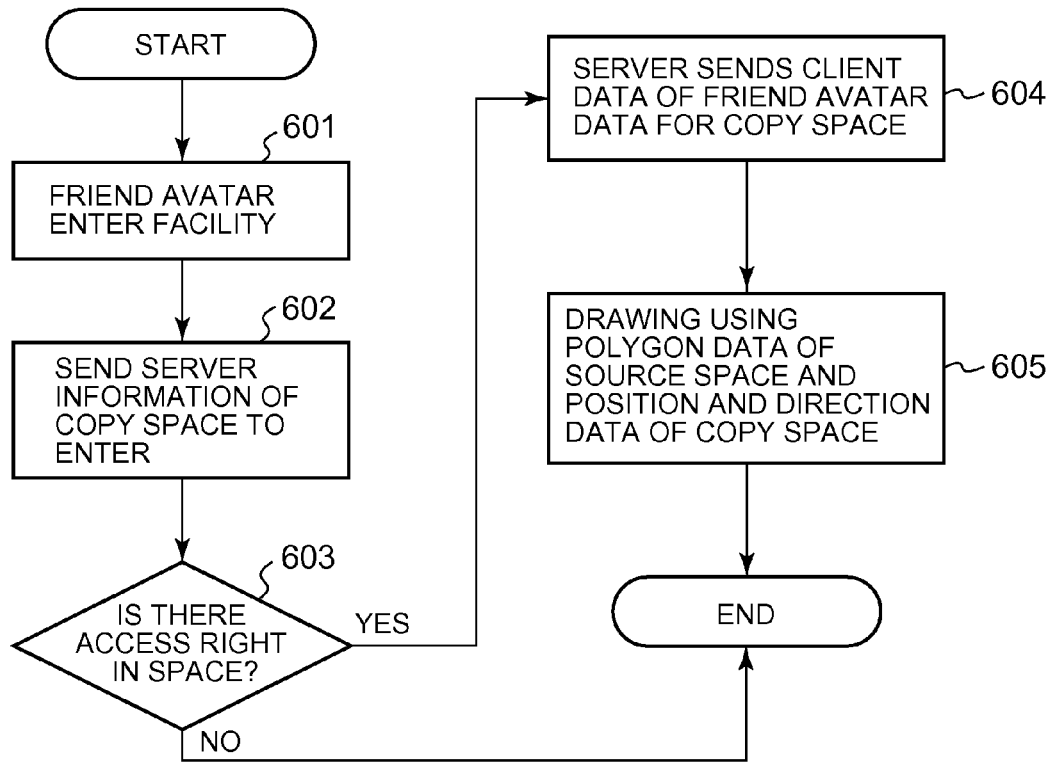
FIG. 6A is a flowchart showing a friend avatar entering the copy space, in accordance with the present invention.
Figure 6B:
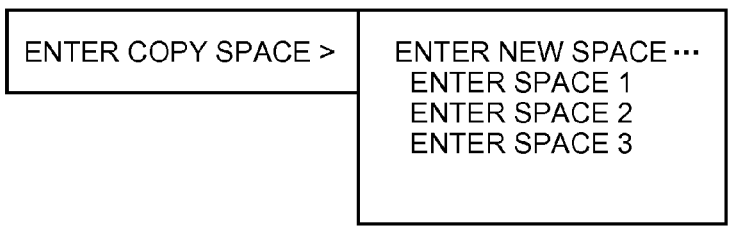
FIG. 6B shows a menu for entering the copy space, in accordance with the present invention.
Figure 7:
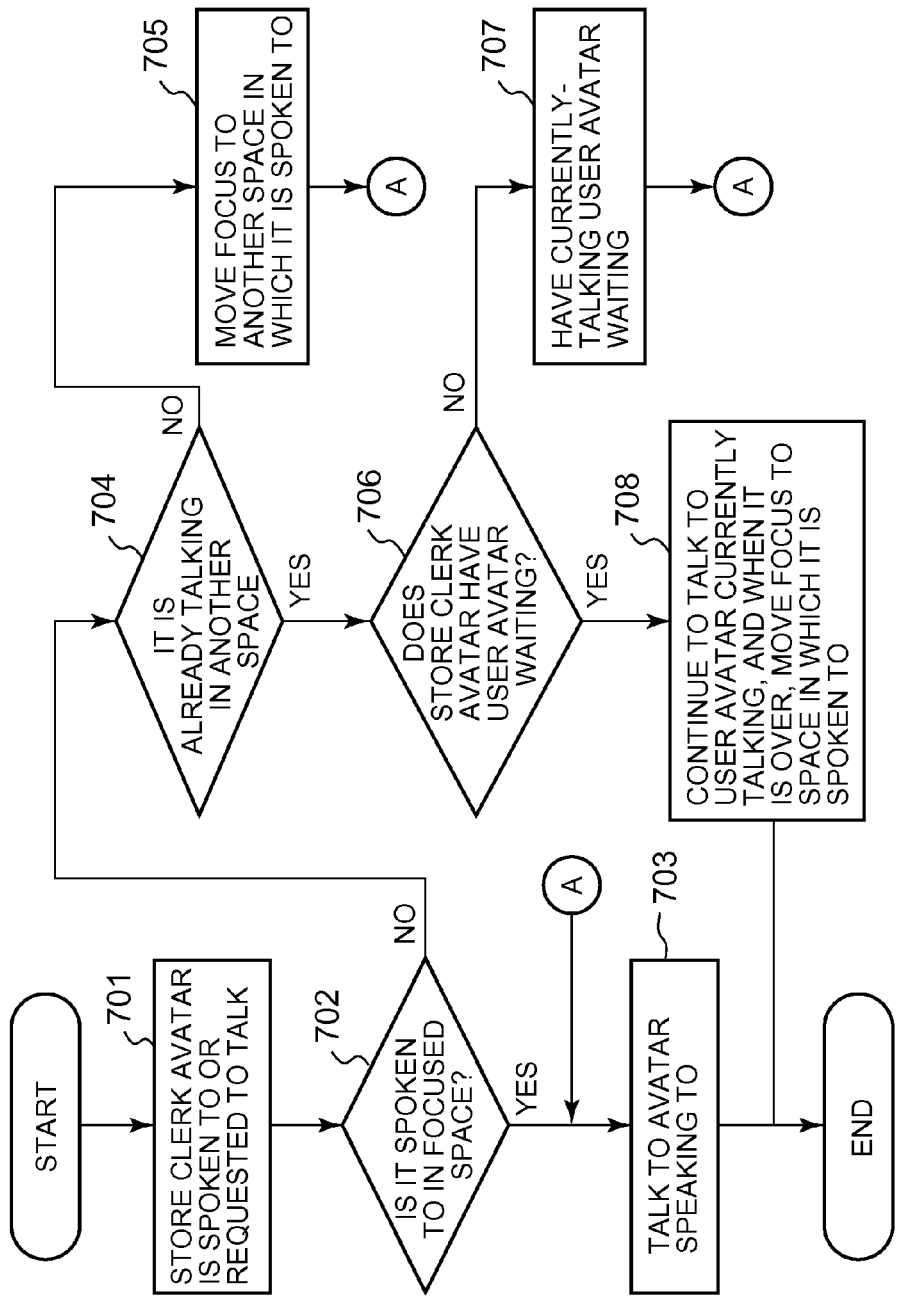
FIG. 7 is a flowchart for moving focus to a space in which a store clerk avatar is spoken to, in accordance with the present invention.

As shown in FIG. 5, if a copy space may be created, an avatar of the user requesting the creation of the copy space only exists in the copy space, not in the original space. On the other hand, the store clerk avatar can exist both in the original space and the copy space.

Among events occurring in the original space, events related to avatars do not affect the data of the copy space and the source space. For example, if a third party avatar appears in the original space, the third party avatar may not be displayed in the copy space. This is because the third party avatar may not have the access right to enter the copy space. However, among the events occurring in the original space, an event related to an object such as, for example, that a stock-out product is not displayed can be reflected in the copy space. This can be because there is inconvenience that a transaction is conducted in the copy space despite that the product is out of stock. Further, among the events occurring in the copy space, events related to avatars do not affect the data of the original space and the source space. However, among the events occurring in the copy space, an event related to an object such as, for example, that a stock-out product may not be displayed can be reflected in the original space. This can be because there may be inconvenience that a product can be displayed in the original space despite that the product may be out of stock and hence a transaction can be conducted.

Further, when an object is created in the copy space, the number associated with the object and the polygon data of the object may be added as data of the source space, and the number associated with the object and the position and direction data of the object can be added as data of the copy space. However, since the object created in the copy space may not be reflected in the original space, the data of the original space may not be changed.

The access right list can be preset by the administrator operating the facility. Further, the access right list for the copy space can be changed in such a manner that the server system operating the facility confirms, using a so-called blacklist database stored in a predetermined server system, if the user requesting the creation of the copy space appears in the blacklist. For example, if the user requesting the creation of the copy space appears in the blacklist, the server system operating the facility can dynamically change the access right list for the copy space not to permit the user to enter the copy space. Access control different from the original space can be performed on the copy space.

The operation items in the access right list for the copy space can include, but may not be limited to, creation of the copy space, entry to the copy space, transaction, entry to the copy space of another avatar associated with the user avatar, for example, a friend avatar of the user avatar, and script operation.

In the copy space, the user avatar can communicate with the store clerk avatar to continue a transaction like in the real world. As a communication method, a chat format on the display device or a format through a voice input device and output device can be employed.

A friend avatar of the user avatar can enter the copy space created by the user avatar. A method of allowing the friend avatar to enter the copy space created by the user avatar will be described with reference to FIG. 6A.

A friend avatar visits the facility (step 601). The friend avatar can enter the facility with the user avatar or come later than the user avatar. However, the friend avatar needs to know in advance that the user avatar creates or may be creating the copy space by any means, for example, by mail or telephone in the real world. The friend requests the server system to enter the copy space that has already created by the user avatar (step 602). As one aspect, the request can be originated by selecting a menu display item, e.g., "Enter Space 1" (see FIG. 6B) displayed on the display device connected to the friend's client system using an input device such as the mouse. As another aspect, the request can be originated by a friend's voice instruction to the client system, e.g., by saying "Enter copy space 1." The friend's request can be sent from the friend's client system to the server system managing the facility. In response to the friend's request, the server system checks the access right list for the copy space to confirm if the friend avatar has the right to enter the copy space requested by the friend avatar, i.e., the copy space that has been already created by the user (step 603). The user avatar previously notifies the facility that the friend avatar can enter the copy space created by itself so that the facility can update the operation items related to the friend avatar in the access right list. Alternatively, the administrator of the server system operating the facility can set by default in the access right list that a friend avatar(s) can enter the copy space, so that the server system can confirm, using the blacklist database stored in the predetermined server system, if the friend requesting to enter the copy space appears in the blacklist to change the operation items in the access right list for the copy space. This can prevent the user avatar from bringing the friend avatar in the copy space as it likes, or the friend avatar from entering the copy space created by the user avatar as it like. If the friend avatar has the right to enter the copy space, the server system sends friend avatar data for the copy space to the friend's client system in addition to the object data, user avatar data, and store clerk avatar data for the copy space of the facility (step 605). On the other hand, if the friend avatar does not have the right to enter the copy space requested by the friend avatar, the server system can reject the request to enter the copy space. Then, a message of rejection can be sent from the server system to the friend's client system, and displayed on a display device connected to the friend's client system or notified the friend as a voice message. In step 605, the friend's client system can reconstruct the copy space of the facility based on the sent object data, user avatar data, friend avatar data, and store clerk avatar data for the copy space in order to display the copy space of the facility on the display device connected to the friend's client system. When the copy space of the facility is displayed on the display device connected to the friend's client system, the friend avatar of the user avatar may also be displayed within the copy space. Further, the friend avatar can be displayed within the copy space on the display connected to the client system of the user avatar. Note that the approved operation items and the disapproved operation items in the access right list can vary between the user avatar and the friend avatar. For example, it can be set that the user avatar is approved to perform the operation item "Transaction" but the friend avatar may not be approved to perform the operation item "Transaction."

The following describes the store clerk avatar of the facility in the copy space.

When the store clerk avatar in the original space is moved to the copy space, the store clerk may disappear from the original space. Therefore, unlike the user avatar, it can be preferable that the store clerk avatar can be free to move back and forth between the original space and the copy space of the facility. Further, if there are plural user avatars in the facility and hence there may be plural copy spaces of the facility, it can be preferable that the store clerk avatar can be free to move back and forth among the original space and the plural copy spaces of the facility. To this end, the store clerk avatar can be displayed in the original space and one or more copy spaces. A store clerk in the real world may deal with the store clerk avatar in the original space and the store clerk avatar in one or more copy spaces, but it can be difficult to deal with the store clerk avatar in plural spaces. Therefore, one space to which the store clerk avatar belongs may be so focused that the other spaces are not focused though the store clerk avatar may be displayed. The store clerk avatar belonging to the focused space can communicate with the user avatar that has spoken to the store clerk avatar. However, the store clerk avatar belonging to an unfocused space cannot communicate with the user avatar that has spoken to the store clerk avatar.

If an identical store clerk avatar exists in the original space and the plural copy spaces of the facility, the store clerk avatar can be spoken to by the user avatar both in the original space and the copy spaces. In such a case, it may be needed to move the focus to the space to which the store clerk avatar spoken to by the user avatar belongs. The following describes, with reference to FIG. 7, a method of moving focus to a space to which a store clerk avatar spoken to belongs when the identical store clerk avatar exists in plural spaces.

There is a case where a store clerk avatar that is not operated by a store clerk in the real world may be spoken to or requested to talk by a user avatar in the original space or copy space (step 701). In this case, the store clerk in the real world who operates the store clerk avatar can switch the focused space by selecting a space to be focused on the display device, i.e., either the original space or the copy space, or any one of the original space and the plural copy spaces. The store clerk avatar belonging to the focused space can communicate with the user avatar speaking to the store clerk avatar. If the space in which the store clerk avatar has been spoken to or requested to talk is a space in which there is the store clerk avatar currently operated by the store clerk in the real world (i.e., focused space) (Yes in step 702), the space has already been focused. Therefore, the store clerk avatar can continue to communicate with the user avatar by speaking to or requesting to talk (step 703). On the other hand, if the space in which the store clerk avatar has been spoken to or requested to talk is a space in which there is no store clerk avatar currently operated by the store clerk in the real world (i.e., unfocused space) (No in step 702), it can be checked if the store clerk avatar is already talking to the user avatar in another space (step 704). If the store clerk avatar is already talking to the user avatar in another space, the focus can be moved to the space in which the store clerk avatar has been spoken to (step 705) to talk to the user avatar that has been spoken to or requested to talk (step 703). On the other hand, if the store clerk avatar is not already talking to the user avatar in another space, it can be selected whether to keep waiting the user avatar speaking or requesting to talk to the store clerk avatar (step 706). The selection can be made by selecting, from the selection menu displayed on the screen of the display device, the store clerk in the real world sees. If the store clerk avatar does not have the user avatar waiting, the store clerk avatar may have a currently talking user avatar waiting (step 707) to talk to the user avatar speaking to or requesting to talk (step 703). On the other hand, if the store clerk avatar has the user avatar waiting, the store clerk avatar continues to talk to the currently talking user avatar, and when it is over, the focus can be moved to the space where there is the user avatar speaking to or requesting to talk (step 708). Then, the store clerk avatar can start talking to the user avatar speaking to or requesting to talk (step 703).

Figure 8:
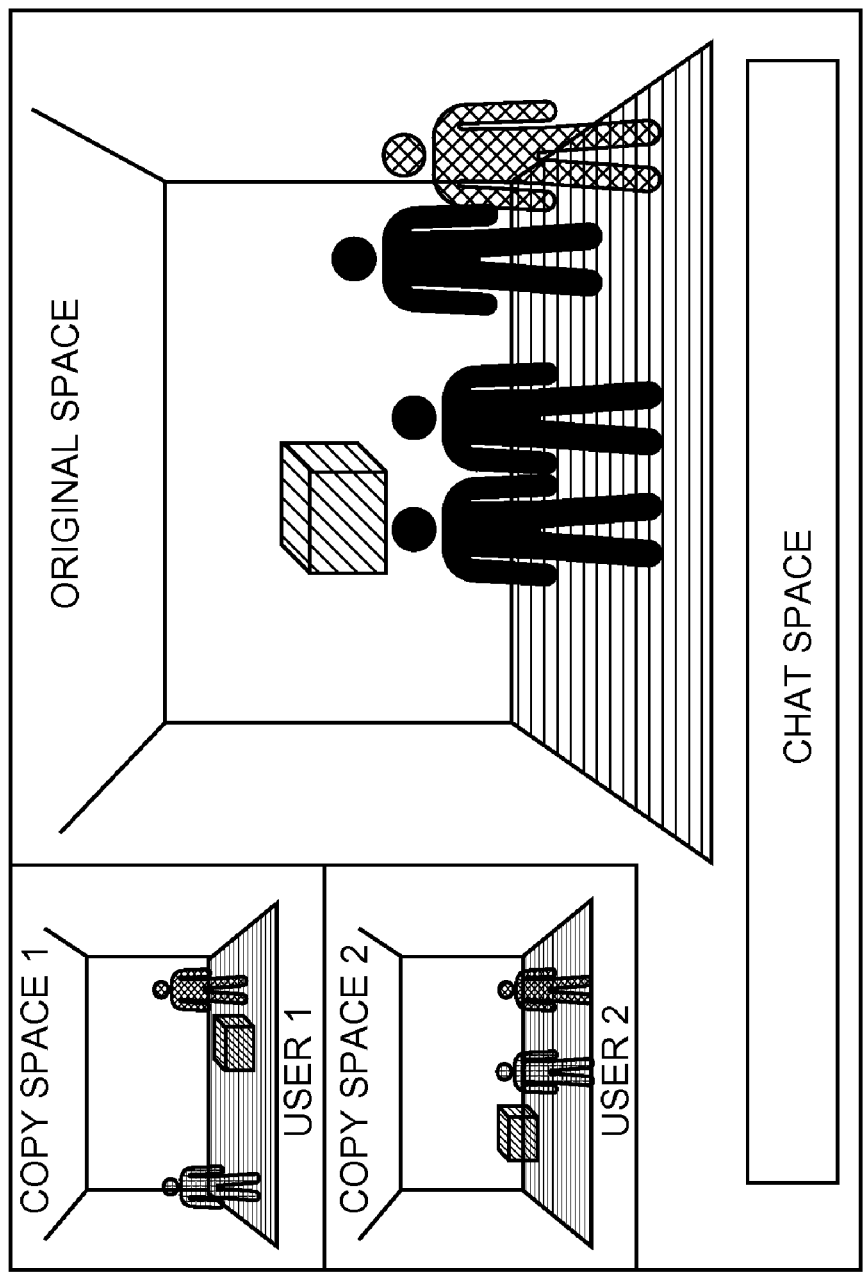
FIG. 8 shows a screen of a display device a store clerk in the real world sees, in accordance with the present invention.

FIG. 8 shows a screen of a display device the store clerk in the real world sees. The display device the store clerk in the real world sees can be a display device directly connected to the server system, or a display device connected to a client system for the store clerk connected to the server system through a computer network.

In FIG. 8, an original space, two copy spaces (copy space 1 and copy space 2), and a chat space can be displayed on the display device. The copy space 1 can be created by user 1. The copy space 2 is created by user 2. Now, since the original space is focused, the original space is displayed in a larger area than the two copy spaces. The store clerk in the real world can communicate with a user avatar existing in the focused space (in the original space of FIG. 8) through the chat space. The store clerk in the real world can know, from a message (alert) displayed on the screen of the display device, that he or she is spoken to or requested to talk from a user avatar in an unfocused space. The store clerk in the real world can change the focused space by clicking, using an input device such as the mouse, in an area on the screen where the space to be focused is displayed, or by selecting the number of the space to be focused, e.g., "Copy Space 1." Then, the store clerk in the real world can operate the store clerk avatar in the focused space. Thus, even if a single store clerk avatar exists in a plurality of spaces, the store clerk in the real world can operate the store clerk avatar in the respective spaces.

Note that the screen of the display device the user sees in the real world may be almost the same as the screen of the display device the store clerk in the real world sees. In other words, on the display device connected to the user's client, the original space, the copy space, and the chat space are displayed. Note further that, on the screen of the display device the user sees, only the copy space(s) created by the user or the friend and in which the user is displayed within the copy space may be displayed.

When the transaction target may be a product or service in the 3D virtual space, if the transaction can be established in the copy space, the server system managing the facility can reflect, in the original space of the 3D virtual space, the transaction content in the copy space. For example, if the user avatar purchases, in the copy space, a product existing in the 3D virtual space, the product can be copied as the belongings of the user avatar. Alternatively, if the user avatar purchases, in the copy space, service offered in the 3D virtual space, the user avatar can receive the service in the original space or in the copy space in which the service is offered. On the other hand, if the transaction target is an actual product or service, the facility may send the transaction content to (the server system managing) an actual store to ship the actual product or providing the actual service to the user.

When the user avatar exits the facility, i.e., it exits the facility in the copy space of the facility, or in response to receiving the user's request from the client system to return from the copy space to the original space, the server system managing the facility deletes the data of the copy space, i.e., the object data, data of the user avatar, and data of the store clerk avatar for the copy space. Then, the user's client system and the server system of the facility delete the display of the copy space from the display devices connected respectively. Alternatively, if the avatars such as the user avatar and the store clerk avatar may all disappear from the copy space, the server system can delete the copy space. As one aspect, the request may be originated by selecting a menu display item, e.g., "Delete Copy Space" displayed on the display device connected to the user's client system using an input device such as the mouse. As another aspect, the request is originated by a user's voice instruction to the client system, e.g., by saying "Delete copy space." The user's request may be sent to the server system managing the facility.

Figure 9:
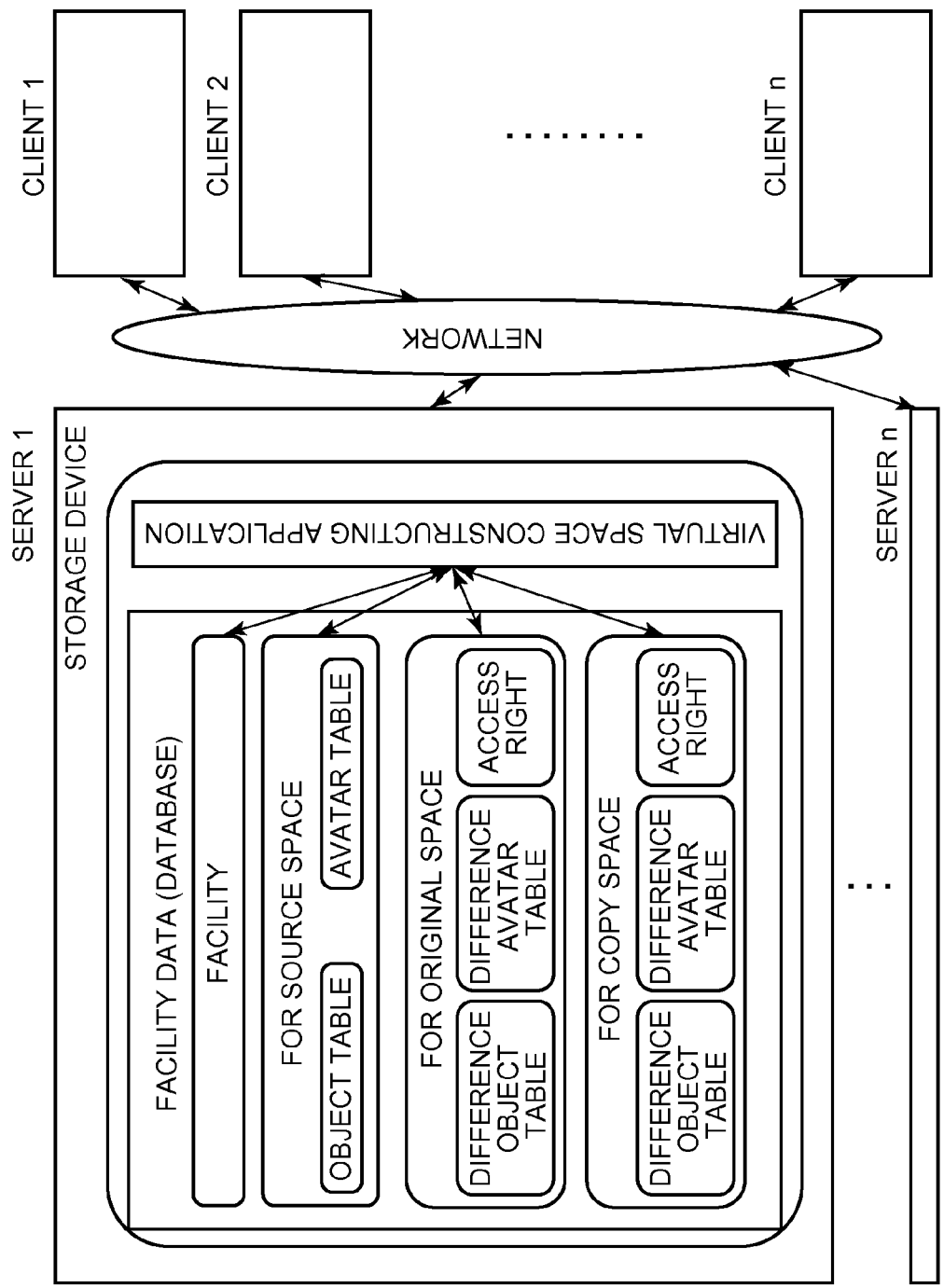
FIG. 9 is a block diagram of a transaction system according to the present invention, in accordance with the present invention.

According to the present invention, as shown in FIG. 9, the transaction system for implementing the present invention includes a 3D virtual space, at least one server system for realizing the facility, and at least one user's client system connected to the server system. The server system and the client system are connected through a computer network, e.g., a wire network or a wireless network. The networks include LAN (Local Area Network), WAN (Wide Area Network), and MAN (Metropolitan Area Network).

The server system typically has a CPU and a main memory connected to a bus. Then, a display device such as an LCD monitor may be connected to the bus through a display controller. Further, storage devices, e.g., various drives such as a hard disk, CD, and DVD may be connected through an IDE or SATA controller. The client system also has the same internal configuration as the server system.

The storage device of the server system stores a virtual space constructing application for providing a 3D virtual world, and a database for realizing the 3D virtual space. The virtual space constructing application acquires necessary data from the database in response to various requests from the client system. The database includes data for displaying the appearance of the facility, the above-mentioned data of the source space, data of the original space, and data of the copy space.

It should be understood, of course, that the foregoing relates to exemplary embodiments of the invention and that modifications may be made without departing from the spirit and scope of the invention as set forth in the following claims.

What is claimed is:

1. A method for conducting a first transaction, in at least one server system connected to at least one client system through a computer network, between a first avatar associated with a user of the client system in a 3D virtual space provided by the server system and a facility provided by the server system, the method comprising:

allowing the server system to send the client system, in response to receiving a user request from the client system to permit the first avatar to enter the facility, object data, and first avatar data for a space within the requested facility (hereinafter called the original space of the facility), and second avatar data associated with the facility stored in a storage device of the server system;

generating a source space of the facility based on the object data and first avatar data of the original space of the facility, wherein the object data and the first avatar data of the original space of the facility reflect a difference in position and direction from data for the source space;

allowing the server system to confirm, in response to receiving a user request from the client system to generate a copy space of the facility by copying the original space of the facility, whether the first avatar and the second avatar can enter the copy space according to an access right list for the copy space of the facility stored in the storage device; and allowing, if they can enter, the server system to send the client system the object data, first avatar data, and second avatar data for entry into the copy space of the facility stored in the storage device of the server system, wherein the first avatar and the second avatar can conduct a second transaction in the copy space of the facility and the user can communicate directly with the first avatar and the second avatar through a chat space;

creating an avatar table for the source space using the data for the source space;

creating an avatar table for the copy space using position and direction data from avatar data of the source space; and creating an avatar in the copy space using the data in the avatar table for the source space.

2. The method according to claim 1, further comprising a step of receiving a user request from the client system to confirm if the facility or the server system providing the facility is authentic.

3. The method according to claim 1, wherein the access right list includes approved operation items and disapproved operation items associated with the first avatar, and approved operation items and disapproved operation items associated with the second avatar.

4. The method according to claim 1, further comprising a step of allowing the server system to delete, from the storage device, the object data, the first avatar data, and the second avatar data for the copy space of the facility in response to the fact that the first avatar exits the facility in the copy space of the facility or in response to receiving a user request from the client system to return from the copy space to the original space.

5. The method according to claim 1, wherein the object data for the original space of the facility includes an object number associated with each object and position and direction data for the object, and avatar data for the original space of the facility includes an avatar number associated with each avatar and position and direction data for the avatar, and object data for the copy space of the facility includes an object number associated with each object and position and direction data for the object, and avatar data for the copy space of the facility includes an avatar number associated with each avatar and position and direction data for the avatar.

6. The method according to claim 1, further comprising:

a step of allowing the server system to confirm, in response to receiving a second user request from another client system to permit a third avatar associated with the first avatar to enter the copy space of the facility, whether the third avatar can enter the copy space of the facility according to an access right list for the copy space stored in the storage device; and a step of allowing the server system to send the other client system, if the third avatar can enter the copy space of the facility, object data, first avatar data, second avatar data, and third avatar data for the copy space of the facility stored in the storage device of the server system, and further send the one client system third avatar data for the copy space of the facility.

7. The method according to claim 1, wherein the copy space of the facility is displayed on a display device connected to the client system together with the original space of the facility, and the display of the copy space of the facility or the display of the original space of the facility displayed on the display device can be selected to enable switching of a focused space.

8. The method according to claim 1, wherein the second avatar is displayed both in the copy space of the facility and in the original space of the facility displayed on the display device connected to the client system so that the second avatar can communicate with the first avatar in the focused space by switching the focused space.

9. A computer program product stored on a non-transitory computer usable storage medium configured to cause at least one server system connected to at least one client system through a computer network to conduct a transaction between a first avatar associated with a user of the client system in a 3D virtual space provided by the server system and a facility provided by the server system, the computer program product configured to allow the server system to execute the steps according to any one of claims 1 to 8.

10. A server system including of at least one server system connected to at least one client system through a computer network to carry out a first transaction between a first avatar associated with a user of the client system and a facility provided by the server system in a 3D virtual space provided by the server system, the server system comprising:

a sending device configured to send the client system, in response to receiving a user request from the client system to permit the first avatar to enter the facility, object data, and first avatar data for a space within the requested facility (hereinafter called the original space of the facility), and second avatar data associated with the facility, a confirming device configured to confirm, in response to receiving a user request from the client system to generate a copy space of the facility by copying the original space of the facility, whether the first avatar and the second avatar can enter the copy space according to an access right list for the copy space of the facility;

a generating device configured to generate a source space of the facility based on the object data and first avatar data of the original space of the facility, wherein the object data and the first avatar data of the original space of the facility reflect a difference in position and direction from data for the source space;

the sending device being configured to send the client system object data, first avatar data, and second avatar data for the copy space of the facility; and a storage device configured to store the object data, the first avatar data, and the second avatar data for the original space of the facility, the object data, the first avatar data, and the second avatar data for the copy space of the facility, and the access right list for the copy space of the facility, wherein the first avatar and the second avatar conduct a second transaction in the copy space of the facility;

the storage device further being configured to create an avatar table for the source space using the data for the source space and create an avatar table for the copy space using position and direction data from avatar data for the source space; and a displaying device configured to display multiple copy spaces and a chat space of the facility.

11. The server system according to claim 10, further comprising a receiving device configured to receive a user request from the client system to confirm if the facility or the server system providing the facility is authentic.

12. The server system according to claim 10, wherein the access right list includes approved operation items and disapproved operation items associated with the first avatar, and approved operation items and disapproved operation items associated with the second avatar.

13. The server system according to claim 10, further comprising a deleting device configured to delete, from the storage device, the object data, the first avatar data, and the second avatar data for the copy space of the facility.

14. The server system according to claim 10, wherein object data for the original space of the facility includes an object number associated with each object and position and direction data for the object, and avatar data for the original space of the facility includes an avatar number associated with each avatar and position and direction data for the avatar, and object data for the copy space of the facility includes an object number associated with each object and position and direction data for the object, and avatar data for the copy space of the facility includes an avatar number associated with each avatar and position and direction data for the avatar.

15. The server system according to claim 10, wherein the storage device further stores third avatar data associated with the first avatar for the original space of the facility and third avatar data for the copy space of the facility, and the access right list further includes approved operation items and disapproved operation items associated with the third avatar.

16. The server system according to claim 15, wherein the displaying device is configured to display the third avatar in the copy space of the facility on the display device connected to the client system if the third avatar can enter the copy space of the facility created by the first avatar according to the access right list.

* * * * *